(No Model.) 2 Sheets—Sheet 1.
E. G. FERGUSON & J. P. HOLMEN.
TENDER FOR TRACTION ENGINES.
No. 601,225. Patented Mar. 22, 1898.
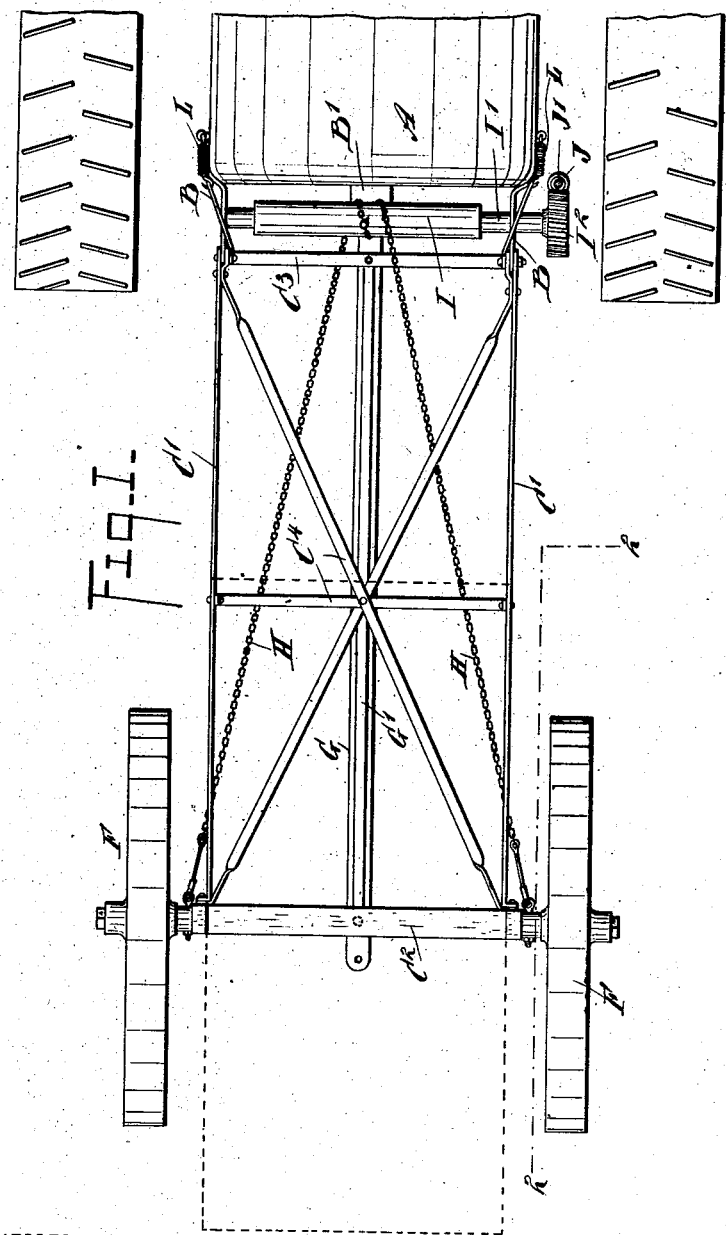
WITNESSES:
Otto Spieth
INVENTORS
E. G. Ferguson
J. P. Holmen
BY
ATTORNEYS.

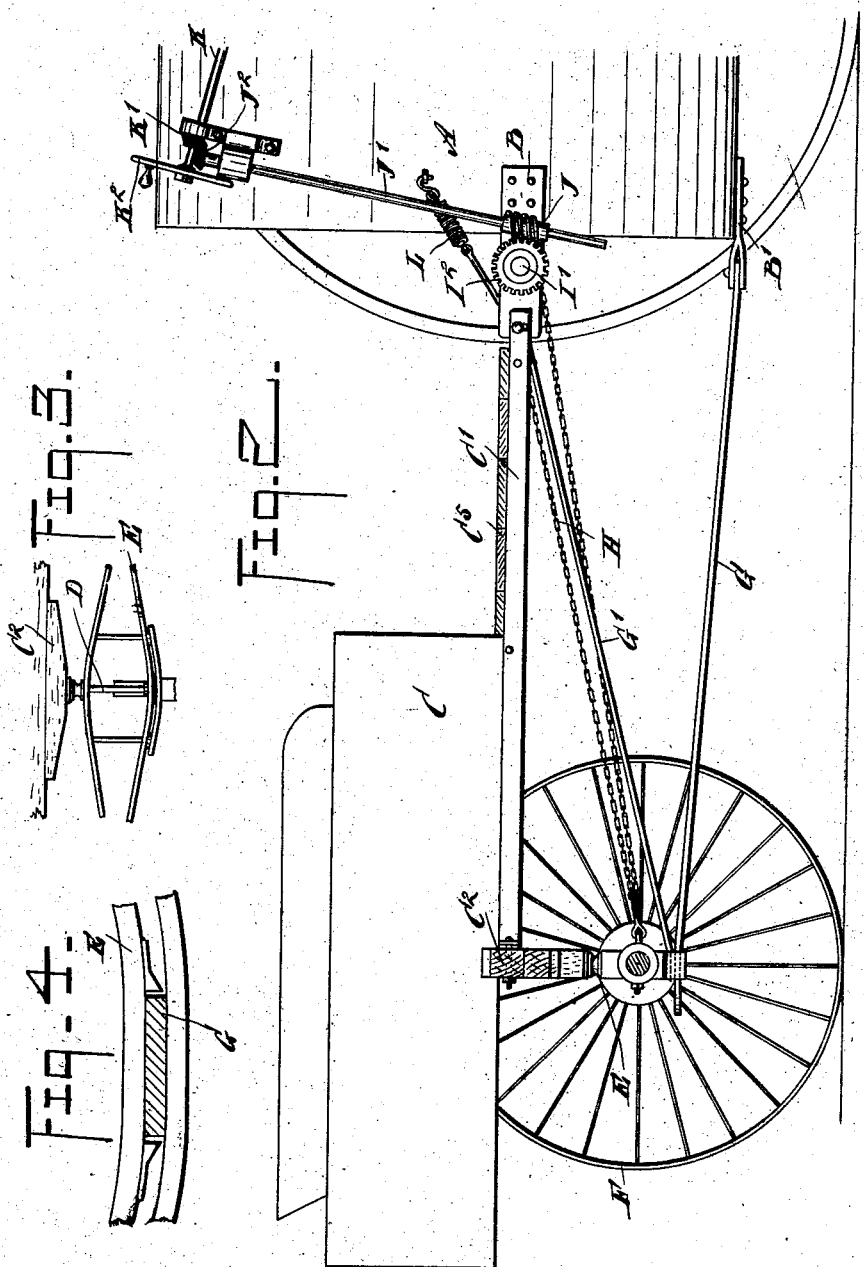

UNITED STATES PATENT OFFICE.

EDWARD G. FERGUSON AND JOHN P. HOLMEN, OF KENSETT, IOWA.

TENDER FOR TRACTION-ENGINES.

SPECIFICATION forming part of Letters Patent No. 601,225, dated March 22, 1898.

Application filed April 20, 1897. Serial No. 632,952. (No model.)

*To all whom it may concern:*

Be it known that we, EDWARD G. FERGUSON and JOHN P. HOLMEN, both of Kensett, in the county of Worth and State of Iowa, have invented a new and Improved Tender for Traction-Engines, of which the following is a full, clear, and exact description.

The object of the invention is to provide a new and improved tender for traction-engines and similar machines, and arranged to steer the tender and engine simultaneously and in the proper direction, and to permit of running the engine with the tender attached rearwardly, if desired.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a plan view of the improvement with the tender-body removed. Fig. 2 is a sectional side elevation of the same on the line 2 2 of Fig. 1. Fig. 3 is a rear end elevation of part of the wheeled vehicle, showing the connection between the axle and the body; and Fig. 4 is an enlarged rear end elevation showing the connection of the reach-rod with the axle.

On the sides of the boiler A of the traction-engine are secured the rearwardly-extending brackets B, on which are bolted or otherwise fastened the forward ends of the side rails or shafts C' of a wheeled vehicle having a body C formed in its lower portion with the usual water-tank and with a fuel-box on the top of the said tank. The body C has its bolster $C^2$ connected by a king-bolt D with an axle E, carrying the two wheels F, traveling on the ground, the body being extended equal distances to the front and rear of the axle, as plainly indicated in Fig. 2, so as to bring the load to bear principally on the wheels instead of on the shafts. A reach-rod G connects the lower end of the king-bolt D with a bracket B', attached to the under side of the boiler A, and a brace G' extends from the king-bolt upwardly to connect with the cross-piece $C^3$, reaching from one shaft C' to the other. The shafts are additionally strengthened and braced by a suitable framework $C^4$, as plainly indicated in Fig. 1. The axle E is connected equal distances from the king-bolt with the ends of a chain or rope H, extending forwardly and upwardly to wind on a drum I, having its shaft I' journaled in suitable bearings in the brackets B, previously mentioned. On one outer end of the shaft I' is secured a worm-wheel $I^2$ in mesh with a worm J, secured on a shaft J', extending upwardly and journaled in suitable bearings attached to the boiler A. On the upper end of the shaft J' is secured a beveled gear-wheel $J^2$ in mesh with a beveled gear-wheel K', secured on the steering-shaft K of the steering mechanism for the traction-engine, the said shaft K being provided at its rear end with a hand-wheel $K^2$, adapted to be turned by the engineer, to steer the traction-engine in the desired direction. Now it will be seen that when the shaft K is turned to steer the traction-engine a rotary motion is given by the beveled gear-wheels K' and $J^2$ to the shaft J', which by the worm J and worm-wheel $I^2$ rotates the shaft I' and the drum I, so as to wind up one end of the chain H and unwind the other to cause the axle E to swing on the king-bolt D to the right or left, according to the direction in which the shaft K is turned. Thus when the traction-engine is steered a simultaneous swinging motion is given to the tender, arranged in the form of a two-wheeled vehicle, connected with the rear end of the traction-engine and drawn along by the latter.

On the front ends of the shafts C' is arranged a platform $C^5$ for the engineer to stand on to manipulate the wheel $K^2$ and the connections between the water-tank and the boiler, also for conveniently placing the fuel from the fuel-box into the fire-box of the boiler.

It is evident that by the arrangement described the traction-engine with the tender attached can be readily moved forward or rearward, if desired, without danger of upsetting the tender, as the latter is properly steered and in unison with the traction-engine.

Having thus fully described our invention, we claim as new and desire to secure by Letters Patent—

1. The combination with a traction-engine provided with rearwardly-projecting brackets, of a two-wheeled vehicle having a pivotal connection between its body and axle, and provided with a platform at the front end of the body, the front end of said platform being secured to the brackets, a drum journaled in said brackets and operated from the steering mechanism of the engine, and a chain winding on said drum and having its ends secured to the axle of the vehicle, substantially as described.

2. The combination with a traction-engine provided with rearwardly-projecting brackets on its boiler, of a two-wheeled vehicle having a pivotal connection between its body and the axle and provided with side bars extending from the body and secured to the brackets, a drum journaled in said brackets and operated by the steering mechanism of the engine, and a chain winding on the said drum and having its ends connected with the axle of the said vehicle, substantially as described.

3. The combination with a traction-engine provided with rearwardly-projecting brackets on its boiler, and the steering-shaft of the mechanism of said engine, of a two-wheeled vehicle having a pivotal connection between its body and the axle, and provided with side bars extending from the body and secured to the brackets, a drum mounted in the said brackets, a chain winding on the drum and having its ends secured to the axle of the vehicle, a worm-wheel on the end of the shaft of the drum, an upright shaft having its upper end geared with the said steering-shaft, and a worm on the lower end of the said shaft meshing with the worm-wheel of the drum, substantially as described.

4. The combination with a traction-engine provided with rearwardly-projecting brackets on its boiler, of a two-wheeled vehicle having a pivotal connection between its body and the axle, side bars extending forward from the body and having their ends secured to the brackets of the boiler, a cross-bar connecting the forward ends of the side bars, a reach-rod extending from the pivot of the body to the bracket on the lower portion of the boiler, an inclined brace extending from the pivot of the body to the cross-bar of the said side bars, a drum mounted in the said brackets and operated by the steering mechanism of the traction-engine, and a chain winding on the drum and having its ends secured to the axle of the vehicle, substantially as described.

EDWARD G. FERGUSON.
JOHN P. HOLMEN.

Witnesses:
H. O. HAUGEN,
A. H. BJORGO.